US011409855B2

(12) United States Patent
Stolbikov et al.

(10) Patent No.: US 11,409,855 B2
(45) Date of Patent: Aug. 9, 2022

(54) GESTURE BASED CAPTCHA TEST

(71) Applicant: Lenovo (Singapore) Pte. Ltd., Singapore (SG)

(72) Inventors: Igor Stolbikov, Apex, NC (US); Timothy Winthrop Kingsbury, Cary, NC (US); Joseph Michael Pennisi, Apex, NC (US); Justin Tyler Dubs, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 292 days.

(21) Appl. No.: 15/243,472

(22) Filed: Aug. 22, 2016

(65) Prior Publication Data

US 2018/0052986 A1 Feb. 22, 2018

(51) Int. Cl.
*G06F 21/36* (2013.01)
*H04L 29/06* (2006.01)
*G06F 3/01* (2006.01)

(52) U.S. Cl.
CPC .............. *G06F 21/36* (2013.01); *G06F 3/017* (2013.01); *G06F 2221/2133* (2013.01)

(58) Field of Classification Search
CPC ......... H04L 63/10; H04L 63/08; G06F 21/31; G06F 21/36
See application file for complete search history.

(56) References Cited

U.S. PATENT DOCUMENTS 9,202,105 B1 * 12/2015 Wang ................. G06Q 20/4014

* cited by examiner

*Primary Examiner* — Izunna Okeke
(74) *Attorney, Agent, or Firm* — Ference & Associates LLC

(57) ABSTRACT

One embodiment a method, including: providing, using a processor, a user challenge over a network, wherein the user challenge is associated with a predetermined gesture to be performed by a user; obtaining, using a processor, user image data; determining, using the user image data, that a user has performed the predetermined gesture; and thereafter providing the user access to information. Other aspects are described and claimed.

14 Claims, 3 Drawing Sheets

GESTURE BASED CAPTCHA TEST

BACKGROUND

CAPTCHA (Completely Automated Public Turing test to tell Computers and Humans Apart) tests are commonly used to secure web applications and can be performed in a variety of ways. Common techniques include requiring the user to read distorted images of text and enter that text into an input field for submission and evaluation. Most commonly used CAPTCHA tests are vulnerable to circumvention strategies that include software implemented circumvention and brute force circumvention using human operators.

BRIEF SUMMARY

In summary, one aspect provides a method, comprising: providing, using a processor, a user challenge over a network, wherein the user challenge is associated with a predetermined gesture to be performed by a user; obtaining, using a processor, user image data; determining, using the user image data, that a user has performed the predetermined gesture; and thereafter providing the user access to information.

Another aspect provides a device, comprising: a network connection; a processor; and a memory that stores instructions executable by the processor to: provide a user challenge over a network, wherein the user challenge is associated with a predetermined gesture to be performed by a user; obtain user image data; determine, using the user image data, that a user has performed the predetermined gesture; and thereafter provide the user access to information.

A further aspect provides a program product, comprising: a computer readable storage device that stores code that is executable by a processor, the code comprising: code that provides a user challenge over a network, wherein the user challenge is associated with a predetermined gesture to be performed by a user; code that obtains user image data; code that determines, using the user image data, that a user has performed the predetermined gesture; and code that thereafter provides the user access to information.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
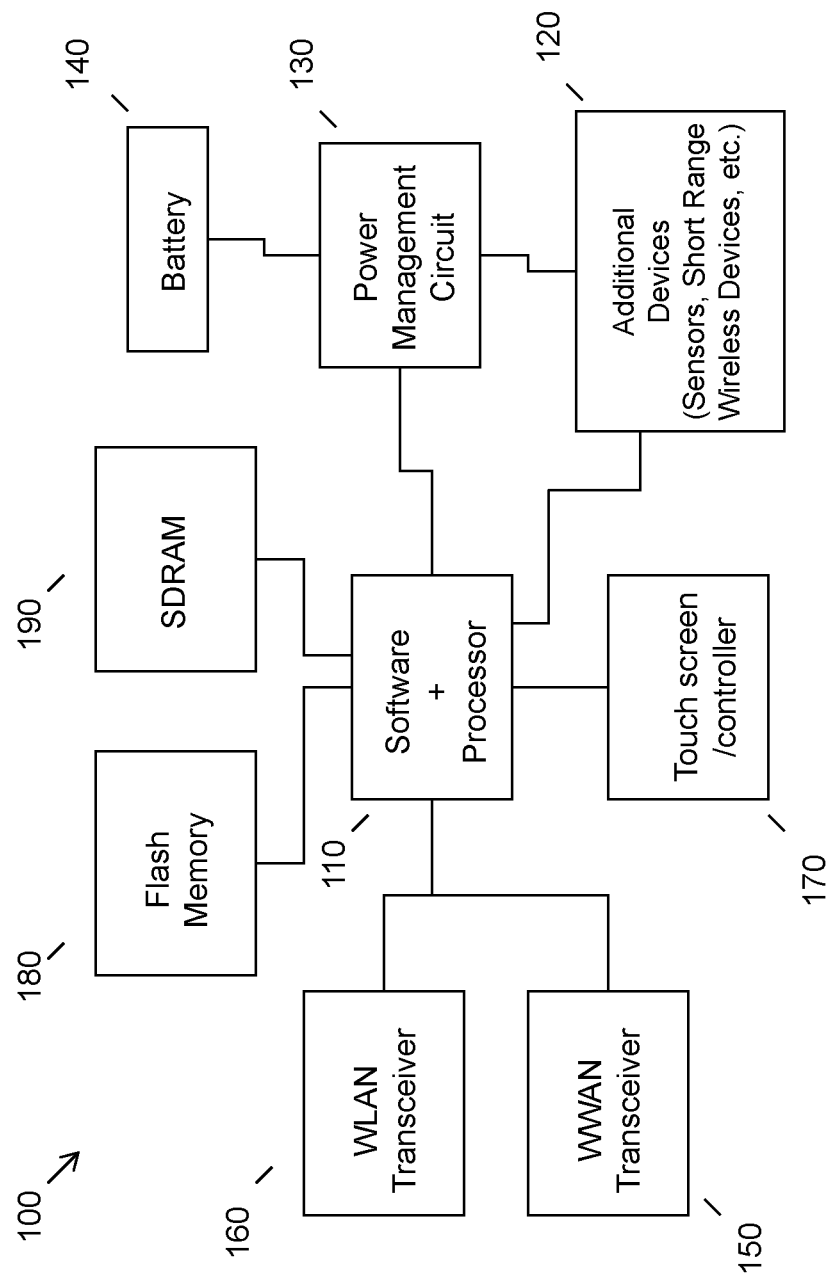
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

CAPTCHA tests can be bypassed using machine learning based attacks, low cost human operators, or by finding flaws in the CAPTCHA test implementation that allow it to be circumvented.

An embodiment solves this problem using a camera (e.g., a standard camera or a three dimensional (3-D) camera) and gesture recognition techniques to confirm a user has performed a predetermined gesture as part of a CAPTCHA test. When the user is presented with the CAPTCHA test, e.g., at a web page, prior at accessing a restricted area, prior to accessing a desktop or mobile application or feature, etc., the user will be given a simple set of instructions to perform a recognizable gesture. Possible examples of such gestures include: raising a left hand and showing three fingers, touching thumbs together, etc. A very large dictionary of gestures/gestures descriptions can be used or gestures/gesture descriptions can be generated in an automated fashion (e.g., at random).

An embodiment observes the performance of the gesture(s) by the user with locally available hardware, e.g., a standard camera, a depth-sensing camera, a stereo camera, data gloves, or other similar devices. The image or gesture data is captured locally and sent to a CAPTCHA protected server environment for evaluation. If the user is confirmed to have performed the gesture correctly or adequately, based on the image or gesture data, then this will be acknowledged and the process allowed to proceed, e.g., by providing a further or subsequent web page.

As an additional defense, image data of the user performing the gestures (e.g., video data) is also captured. This image data is used for a variety of reasons, e.g., to verify that the user is the same person in the future as well as prevent one person from abusing the system by solving CAPTCHA tests for more than one user.

The illustrated example embodiments will be best understood by reference to the figures. The following description is intended only by way of example, and simply illustrates certain example embodiments.

While various other circuits, circuitry or components may be utilized in information handling devices, with regard to mobile device circuitry 100, an example illustrated in FIG. 1 includes a system on a chip design found for example in many smaller or mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included and may be added based on a particular design. For example, additional devices 120 may include a sensor or sensor(s), for example an optical sensor such as a camera, as well as short range wireless devices, e.g., BLUETOOTH wireless communication devices. System 100 often includes a touch screen 170 for data input and display/rendering. System 100 also typically includes various memory devices, for example flash memory 180 and SDRAM 190.

Figure 2:
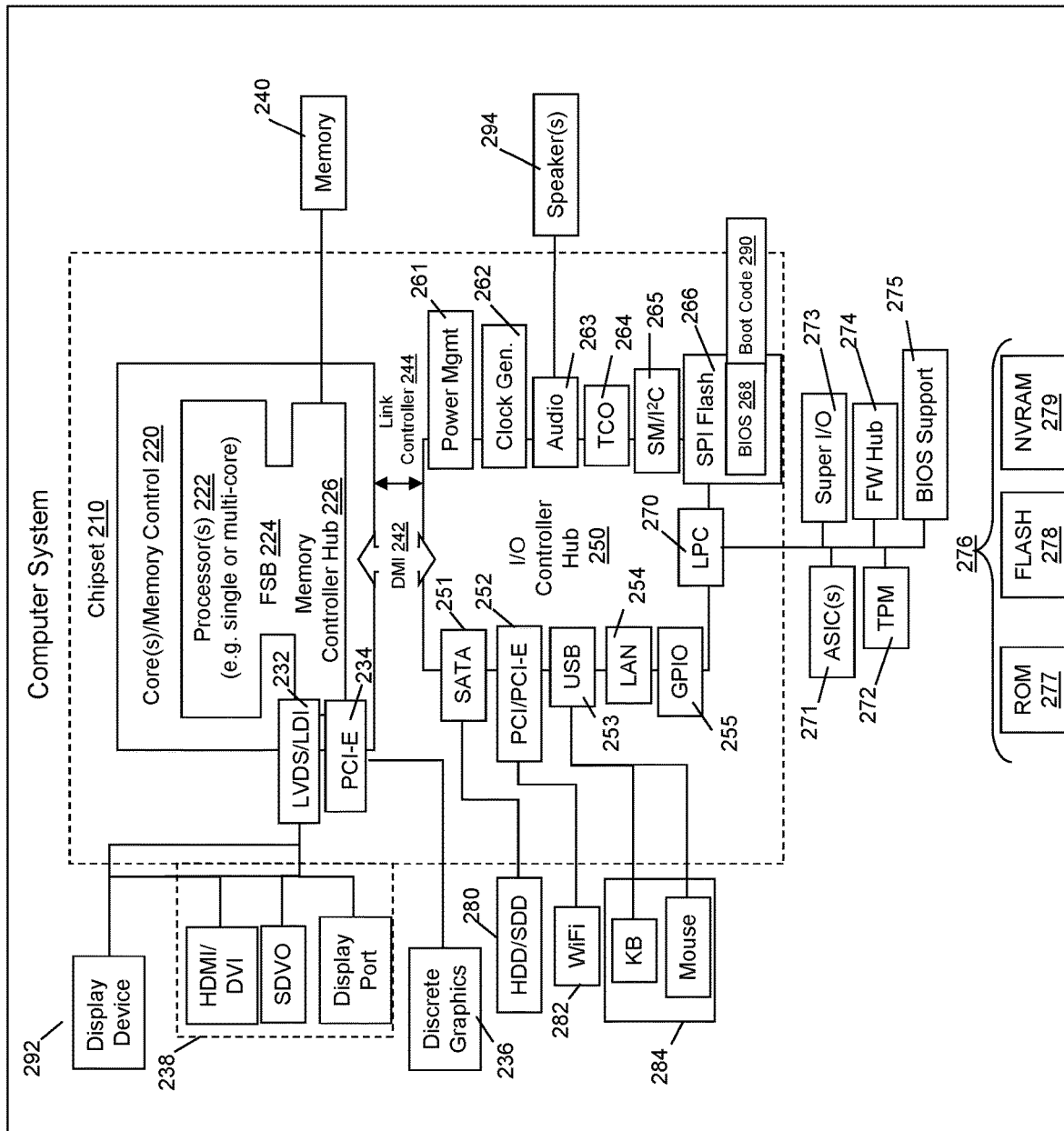
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, biometric data capture device, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as personal computing devices including a tablet computing device, a laptop computing device, a desktop computing device, or any electronic device with which a user is faced with a CAPTCHA test. As a non-limiting example, a secured web page is used to illustrate certain aspects of the claimed embodiments.

Figure 3:
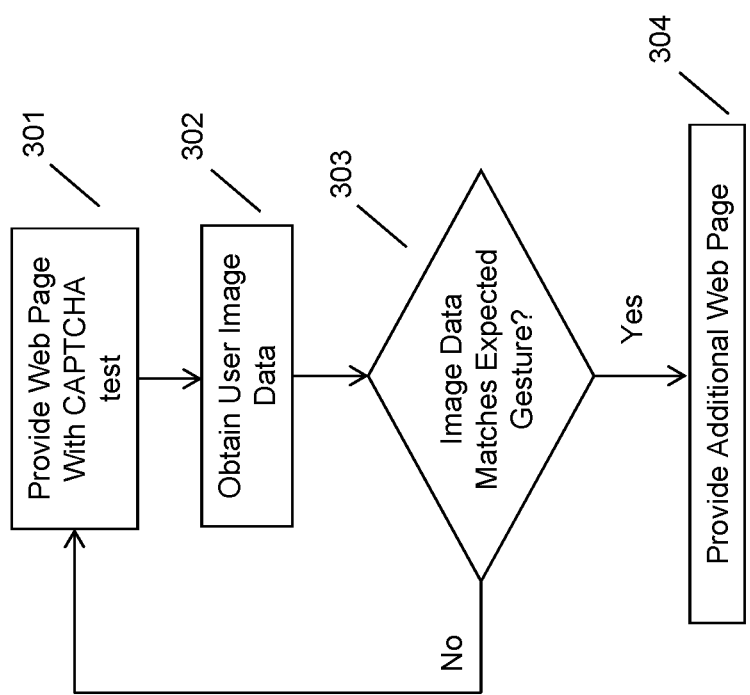
FIG. 3 illustrates an example method of biometric CAPTCHA testing.

Illustrated in FIG. 3 is an example of using gesture data in a CAPTCHA test. An embodiment provides a web page at 301 that includes a CAPTCHA test. That is, when the user requests a given web page that is secured by a CAPTCHA test, the user is thereafter presented with a web page response that includes the CAPTCHA test. The web page provided at 301 includes instructions to perform a recognizable gesture, e.g., to raise a left hand. As will be readily appreciated by those having ordinary skill in the art, a dictionary of gestures descriptions can be used in order to prompt or instruct a user to perform a variety of different gestures.

An embodiment observes the performance of the gesture(s) by the user by obtaining image data at 302, e.g., using locally available hardware such as a standard camera, a depth-sensing camera, a stereo camera, data gloves, or other similar devices. The image data is captured locally and sent to a CAPTCHA protected server environment for evaluation at 302. A gesture detection algorithm is applied to the image data to determine, at 303, if the user is confirmed to have performed the gesture correctly or adequately, based on the image or gesture data obtained at 302. If so, this confirmation will be acknowledged and the process allowed to proceed, e.g., by providing a further or subsequent web page at 304. Otherwise, the user may be presented with another CAPTCHA test, as illustrated in FIG. 3.

In an embodiment, a gesture based CAPTCHA test is therefore provided, e.g., to secure a protected web page requiring human action to obtain. A wide variety of gesture data may be used in this process. For example, the gesture data obtained at 302 may include standard image data, three dimensional (3D) image data, audio data, or a combination thereof.

The web page provided at 301 may include a request that the user perform one predetermined gesture or a series of predetermined gestures. The series of gestures may have to be performed in a predetermined order. Each gesture in the series may be evaluated, at 303, individually, i.e., serially, or each may be evaluated in a batch mode, i.e., using a single evaluation step. Moreover, more than one web page having a gesture based CAPTCHA test may be provided, e.g., as a more secure mechanism or in an effort to confirm weakly matched (low confidence) gesture data.

In an embodiment, the gesture or image data of the user may be stored for later use, e.g., to confirm the same user is or is not performing subsequent gestures. That is, as an additional defense, image data of the user performing the gestures (e.g., video data) is also captured. This image data is stored and may be used for a variety of reasons, e.g., to verify that the user is the same person in the future as well as prevent one person from abusing the system by solving CAPTCHA tests for more than one user.

An embodiment therefore provides an improved CAPTCHA test that uses gesture data, e.g., image data, to confirm that a human is requesting a web page. Furthermore, an embodiment may utilize a series of gestures and/or store gesture data of a user to increase the performance of the CAPTCHA test.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:

receiving, at an information handling device, a request from a user to access content on a webpage;

providing, using a processor and in a single prompt, a user challenge over a network, wherein the user challenge is associated with a request to perform a series of predetermined gestures;

obtaining, in response to the user challenge and using a processor, user image data of the user performing a gesture set;

comparing, subsequent to the obtaining, the gesture set to the series of predetermined gestures in the user challenge;

accessing historical image data associated with an authorized user;

determining, with reference to the historical image data and based on the comparing, whether the gesture set matches the series of predetermined gestures above a confidence threshold and whether the gesture set is performed by the authorized user;

enabling the user access to the content on the webpage responsive to determining that the gesture set matches the series of predetermined gestures above the confidence threshold and that the gesture is performed by the authorized user; and providing, responsive to determining that the gesture set does not match the series of predetermined gestures above the confidence threshold or that the gesture set is not performed by the authorized user, another user challenge, wherein the another user challenge is associated with another series of the predetermined gestures.

2. The method of claim 1, wherein the information is a protected web page requiring human action to obtain.

3. The method of claim 1, wherein the user image data comprises three dimensional (3D) image data.

4. The method of claim 1, further comprising transmitting, over a network, a web page comprising a request.

5. The method of claim 4, wherein the request comprises a request that the user perform the series of predetermined gestures.

6. The method of claim 1, further comprising storing image data of the user.

7. A device, comprising:
a network connection;
a processor; and
a memory that stores instructions executable by the processor to:
receive a request from a user to access content on a webpage;
provide, in a single prompt, a user challenge over a network, wherein the user challenge is associated with a request to perform a series of predetermined gestures;
obtain, in response to the user challenge, user image data of the user performing a gesture set;
compare, subsequent to the obtaining, the gesture set to the series of predetermined gestures in the user challenge;
access historical image data associated with an authorized user;
determine, with reference to the historical image data and based on the comparing, whether the gesture set matches the series of predetermined gestures above a confidence threshold and whether the gesture set is performed by the authorized user;
enable the user access to the content on the webpage responsive to determining that the gesture set matches the series of predetermined gestures above the confidence threshold and that the gesture is performed by the authorized user; and
provide, responsive to determining that the gesture set does not match the series of predetermined gestures above the confidence threshold or that the gesture set is not performed by the authorized user, another user challenge, wherein the another user challenge is associated with another series of the predetermined gestures.

8. The device of claim 7, wherein the information is a protected web page requiring human action to obtain.

9. The device of claim 7, wherein the user image data comprises three dimensional (3D) image data.

10. The device of claim 7, wherein the processor executes instructions to transmit, over the network connection, a web page comprising a request.

11. The device of claim 10, wherein the request comprises a request that the user perform the series of predetermined gestures.

12. The device of claim 7, wherein the processor executes instructions to store image data of the user.

13. The device of claim 7, wherein the device comprises a web server.

14. A program product, comprising:
a computer readable storage device that stores code that is executable by a processor, the code comprising:
code that receives a request from a user to access content on a webpage;
code that provides, in a single prompt, a user challenge over a network, wherein the user challenge is associated with a request to perform a series of predetermined gestures;
code that obtains, in response to the user challenge, user image data of the user performing a gesture set;
code that compares, subsequent to the code that obtains, the gesture set to the series of predetermined gestures in the user challenge;
code that access historical image data associated with an authorized user;
code that determines, with reference to historical image data and based on the comparing, whether the gesture set matches the series of predetermined gestures above a confidence threshold and whether the gesture set is performed by the authorized user;
code that enables the user access to the content on the webpage responsive to determining that the gesture set matches the series of predetermined gestures above the confidence threshold and that the gesture is performed by the authorized user; and
code that provides, responsive to determining that the gesture set does not match the series of predetermined gestures above the confidence threshold or that the gesture set is not performed by the authorized user, another user challenge, wherein the another user challenge is associated with another series of the predetermined gestures.

* * * * *